United States Patent [19]

Durr

[11] 4,183,692
[45] Jan. 15, 1980

[54] CABLE PULLING EYE

[75] Inventor: Helmut E. Durr, Dunwoody, Ga.

[73] Assignee: Western Electric Company, Incorporated, New York, N.Y.

[21] Appl. No.: 947,926

[22] Filed: Oct. 2, 1978

[51] Int. Cl.² ............................................. F16G 11/05
[52] U.S. Cl. .................................. 403/275; 24/122.6; 24/115 A
[58] Field of Search ............... 403/274, 275, 277, 284, 403/285, 280; 24/122.6, 137 L, 136 B, 115 M, 115 A, 122.3

[56] References Cited

U.S. PATENT DOCUMENTS

| | | | |
|---|---|---|---|
| 2,304,194 | 12/1942 | Payne | 24/122.3 |
| 2,327,831 | 8/1943 | Sutton | 403/275 |
| 2,901,822 | 9/1959 | Hayden | 403/284 X |
| 3,989,400 | 11/1976 | Smith et al. | 403/275 |

Primary Examiner—Andrew V. Kundrat
Attorney, Agent, or Firm—Robert B. Kennedy

[57] ABSTRACT

A cable pulling eye is disclosed which comprises a tubular shell having a rounded nose end to which an eye is secured and an open tail end through which the end of a cylindrical cable may be inserted and housed for cable drawing operations through a duct. The shell has a cylindrical tail section adjacent the open tail end of a substantially uniform outside diameter approximating that of the cable. The tail section of the shell uniterally joins a cylinderical nose section of reduced outside diameter adjacent the nose end. The nose section has a relatively thick shell wall while the tail section has a relatively thin shell wall. So constructed, the shell tail section may be swaged into gripping engagement with a cable housed therein without increasing the outside diameter of the shell.

2 Claims, 4 Drawing Figures

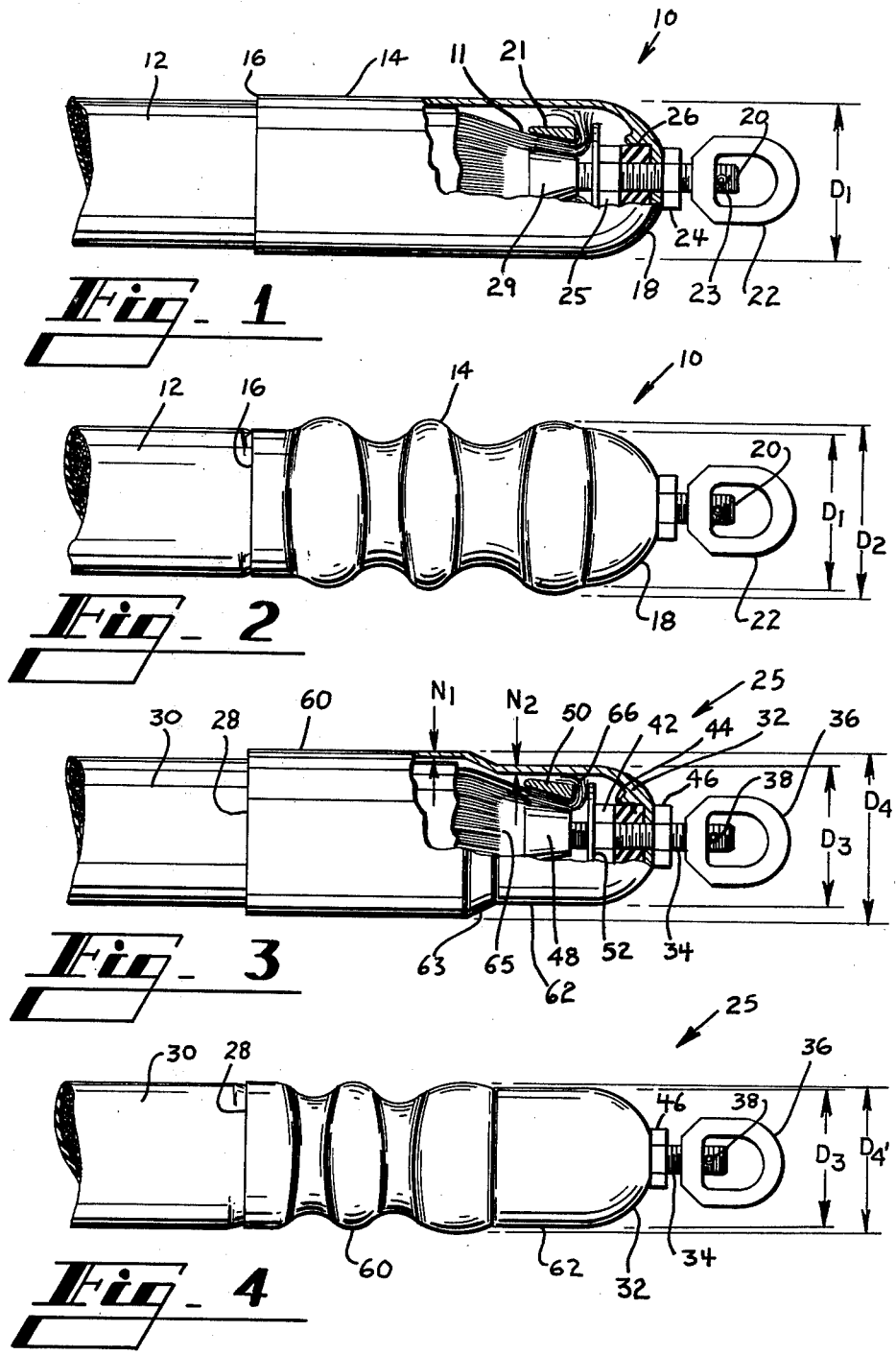

CABLE PULLING EYE

BACKGROUND OF THE INVENTION

This invention relates to cable pulling eyes.

Heretofore cable pulling eyes have been developed for use in pulling cables through ducts. The pulling eyes have comprised a hollow, cylindrical, metallic shell or sleeve having a rounded nose end and an open tail end through which the end of a cable may be inserted and housed. The rounded nose end has an opening through which a bolt extends. An eye is mounted to the bolt exteriorly of the shell nose end. Means for attaching the end of the cable to the eye are located within the shell nose end which include an anchor block secured to the bolt about which a ring is positioned. With this construction the end of a cable may be inserted into the shell through the open tail end and an annular portion of the cable wires routed between the anchor block and ring and then bent back over the periphery of the ring thereby attaching the cable securely to the pulling eye attaching means. The shell may then be swaged into gripping engagement with the periphery of the cable. In this manner the pulling eye is firmly secured to the cable. A pulling cable may then be fastened to the eye for pulling the cable through a duct.

Though the just described cable pulling eyes have functioned well they have imposed a certain limiting effect on efficiency. This has resulted from the diameters of the cable pulling eyes being greater than that of the cables themselves to which they are attached during cable laying operations. To accommodate a particular cable the duct through which it and its pulling eye are to be pulled must have a greater inside diameter than the outside diameter of the pulling eye. Thus, once a cable has been laid therein through which a larger pulling eye than the cable itself is attached while the cable is being laid, additional space will remain within the duct about the cable. This space could, of course, otherwise accommodate additional cable whether in the form of an additional number of wires or larger gauge wire.

That the cable pulling eyes of the prior art have had an outside diameter significantly greater than that of the cable to which they are attached has typically resulted from a swaging operation which is performed on the pulling eye in securely fastening it about the end of a cable. In conducting the swaging operation the pulling eye shell wall has tended to buckle to each side of the annular depressions made by the swaging tool as it is drawn tightly about the eye and cable. A portion of this bulging occurs radially which increases its maximum diameter of the pulling eye shell. The duct through which the pulling eye is to be pulled through must therefore have a size at least as great as the maximum diameter of these shell bulges. If the shell wall were to be thinned such would tend to alleviate the just described problem. Such thinning alone however would tend to weaken the shell to such an extent as to render it susceptible to rupture during pulling operations.

Accordingly, it is a general object to the present invention to provide an improved cable pulling eye.

More specifically, it is an object of the invention to provide a cable pulling eye to which a cable may be secured and pulled through a duct having an inside diameter closely approximating that of the outside diameter of the cable thereby to maximize usage of the duct.

Another object of the invention is to provide a cable pulling eye of the type described having an outside diameter closely approximating that of the cable to which it is secured.

Yet another object of the invention is to provide a cable pulling eye of the type described of relatively simple and economic construction.

SUMMARY OF THE INVENTION

In one form of the invention a cable pulling eye is provided which comprises a tubular shell having a rounded nose end to which an eye is secured and an open tail end into which the end of a generally cylindrical cable may be inserted and housed for cable drawing operations through a duct. The shell has a cylindrical tail section adjacent the open tail end of a substantially uniform outside diameter approximating that of the cable. The tail shell section uniterally joins a cylindrical shell nose section of reduced outside diameter adjacent the nose end. The shell nose section has a relatively thick shell wall while the shell tail section has a relatively thin shell wall. So constructed, the shell tail section may be swaged into gripping engagement with a cable housed therein without increasing the outside diameter of the shell.

BRIEF DESCRIPTION OF THE DRAWING

FIG. 1 is a side elevational view of a cable pulling eye of the prior art positioned on a cable preparatory to being swaged with a portion of the pulling eye shown broken away to reveal internal components.

FIG. 2 is a side elevational view of the cable pulling eye shown in FIG. 1 after being swaged.

FIG. 3 is a side elevational view of a cable pulling eye of the present invention positioned on a cable preparatory to being swaged with a portion of the pulling eye shown broken away to reveal internal components.

FIG. 4 is a side elevational view of the cable pulling eye shown in FIG. 3 after being swaged.

DESCRIPTION OF THE PREFERRED EMBODIMENT

Referring now in more detail to the drawing, there is shown in FIG. 1 a cable pulling eye 10 of the prior art to which an end portion of a cable 12 is to be securely fastened. The cable pulling eye is seen to comprise a tubular, cylindrical, steel shell 14 having an open tail end 16 through which the cable 12 is inserted and a rounded nose end 18 distal the open tail end. A threaded shaft or bolt 20 is seen to protrude out of the rounded shell nose end 18 to which an eye 22 is fastened and held by a cotter pin 23. A nut 24 is threaded onto the bolt flush against the outer surface of the shell nose end while another nut 25 is threaded onto the bolt within the shell nose end flush against an annular resilient seal 26. A washer is seated on the bolt flush against nut 25. A conical cable anchor block 29 is threaded onto the end of the bolt about which a ring 21 is positioned. An annular group of cable wires 11 is routed between the anchor block and ring and back over the ring periphery mechanically coupling the cable 12 to the eye 22.

After the cable pulling eye 10 has been seated upon the end of the cable 12 and fastened thereto as just described, the shell 14 is swaged as shown in FIG. 2 causing the shell to firmly grip the periphery of the cable. After the swaging operation the maximum diameter of the shell is seen to have increased from the original shell diameter $D_1$ to a new maximum shell diameter $D_2$. As a result the cable and cable pulling eye may now only be pulled through a duct of minimum inside diameter $D_2$. Consequently, once the cable has been pulled by the pulling eye through such a duct there will remain space within the duct which the cable could otherwise have occupied. This is the principle problem which the present invention alleviates.

With reference next to FIG. 3 a cable pulling eye 25 constructed in accordance with principles of the present invention is seen to include a tubular, steel shell having an open tail end 28 through which a cable 30 is inserted, and a rounded nose end 32 opposite the open tail end. A shaft or bolt 34 is seen to pass through an opening in the rounded nose end to the exterior of the shell where an eye 36 is mounted and held in place by a cotter pin 38. A nut 46 is threaded upon the bolt 34 snugly against the outer surface of the rounded shell nose end 32 while another nut 42 is threaded about the bolt in abutment with a resilient annular seal or gasket 44.

With continued reference to FIG. 3 the cable pulling eye is further seen to include a conical cable anchor block 48 threaded onto an end portion of bolt 34 within a cylindrical nose portion 62 of the shell adjacent the shell nose end 32. A conical ring 50 is positioned about the conical anchor block 48 while a washer 52 is positioned about bolt 34 between the nut 42 and anchor block 48. The tubular shell is also seen to have a cylindrical tail portion 60 of diameter $D_4$ located adjacent the open tail end 28 which is merged uniterally by a conical step 63 with the nose portion 62 of reduced diameter $D_3$. The wall thickness $N_2$ of the shell nose portion 62 is seen to approximate the thickness of the shell wall of the prior art pulling eye shown in FIGS. 1 and 2 while the wall thickness $N_1$ of the shell tail section 60 is seen to be substantially less than that of the nose portion 62.

The just described cable pulling eye may be readily mounted to a cable by inserting an end of the cable through the shell open tail end 28 and into the position shown in FIG. 3. Here a central group of cable wires 65 are seen to terminate before termination of the ends of an annular, peripheral wire group 66. The central group thus confronts the anchor block 48 while the peripheral group is routed over the conical sides of the anchor block through the ring 50 and then doubled back over the outer periphery of the ring along the inside surface of the shell wall. In this manner the cable is mechanically coupled to the eye 36.

After the cable has been attached the shell tail section 60 is swaged whereupon the shell shape and size change from that shown in FIG. 3 to that shown in FIG. 4. In so doing it will be seen that the original outside diameter $D_4$ of the shell, which is the diameter of shell tail section 60, is reduced to a new maximum outside diameter $D_{4'}$ as shown in FIG. 4. Thus, rather than the swaging operation now causing the maximum outside diameter of the shell to be increased it is actually decreased. Furthermore, since the thickness $N_1$ of the shell tail section 60 is less than that of the prior art shells its diameter prior to swaging more closely approximates that of the cable it accommodates. As an overall result the maximum outside diameter of the shell after the swaging operation has been completed is approximately the same as that of the cable itself. Structural integrity is nevertheless retained by maintaining the wall of the shell nose portion 62 relatively thick.

The just described embodiment of FIGS. 3 and 4 has been provided for attachment to a 3.10 inch outside diameter cable with a cable pulling eye having a diameter $D_4$ of 3.14 inches and a diameter $D_3$ of 2.90 inches. The thickness $N_1$ of shell tail section 60 was 0.020 inches while the thickness $N_2$ of the shell nose section 62 was 0.036 inches. After the swaging operation was performed, the maximum outside diameter $D_{4'}$ was found to measure 3.10 inches which matched that of the cable itself.

It should thus now be apparent that a new cable pulling eye is provided of maximum outside diameter approximating that of the cable itself to which it is secured for pulling operations as through a duct. Its use provides significantly greater utilization of the duct in which the cable is housed following the pulling operation whereby the duct may be substantially filled with cable wires. The new cable pulling eye may employ many elements of prior art pulling eyes thereby providing conversion and adaptation economy.

It should be understood that the just described embodiment merely illustrates principles of the invention in one preferred form. Many modifications, additions and deletions may, of course, be made thereto without the departure from the spirit and scope of the invention as set forth in the following claims.

What is claimed is:

1. A cable pulling eye comprising a tubular shell having a rounded nose end that defines an opening through which a bolt extends and to which an eye is mounted and an open tail end through which the end of a generally cylindrical cable may be inserted and housed for cable drawing operations through a duct, and with said shell having a cylindrical tail section adjacent said open tail end of a substantially uniform outside diameter which unitarilly joins a cylindrical nose section adjacent said nose end of reduced outside diameter, and with said shell nose section having a relatively thick shell wall and said shell tail section having a relatively thin shell wall whereby the shell tail section may be swaged into gripping engagement with a cable housed therein without increasing the outside diameter of the shell, and a cable anchor block mounted to said bolt within said shell nose section and a ring positioned about said anchor block through which an annular array of cable wires may be extended in mechanically coupling the cable with the bolt and eye.

2. In a cable pulling eye assembly which includes a tubular shell having a nose portion formed with a rounded nose end and a tail portion formed with an open tail end into which a generally cylindrical cable may be inserted, a shaft extending through the shell nose end, an eye mounted to the shaft exteriorly of the tubular shell, an anchor block mounted to the shaft within the shell nose portion, and a ring positioned about the anchor block, the improvement comprising said shell nose portion having a hollow, cylindrical wall of selected wall thickness and outside diameter and said shell tail portion having a hollow, cylindrical wall of wall thickness less than said selected nose portion wall thickness and an outside diameter greater than said nose portion wall outside diameter, whereby the shell tail portion may be swaged into gripping engagement with a cable housed therein without increasing the outside diameter of the shell.

* * * * *